(12) United States Patent
Guwaisem et al.

(10) Patent No.: US 10,453,330 B1
(45) Date of Patent: Oct. 22, 2019

(54) OPTICAL MASTER UNIT ALARM COLLECTOR AND TRANSLATOR

(71) Applicant: Saudi Arabian Oil Company, Dhahran (SA)

(72) Inventors: Badie Ali Hassan Guwaisem, Qatif (SA); Hassan Taher Salman Alhelal, Al Mubarraz (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/131,433

(22) Filed: Sep. 14, 2018

(51) Int. Cl.
| | |
|---|---|
| *G08B 25/08* | (2006.01) |
| *G08B 29/04* | (2006.01) |
| *G08B 29/16* | (2006.01) |
| *G08B 25/01* | (2006.01) |
| *H04L 29/08* | (2006.01) |
| *H04B 10/29* | (2013.01) |
| *H04L 12/26* | (2006.01) |
| *G08B 29/06* | (2006.01) |
| *G08B 25/14* | (2006.01) |
| *H04J 3/14* | (2006.01) |

(52) U.S. Cl.
CPC ............. *G08B 29/04* (2013.01); *G08B 25/01* (2013.01); *G08B 25/08* (2013.01); *G08B 25/14* (2013.01); *G08B 29/06* (2013.01); *G08B 29/16* (2013.01); *H04B 10/29* (2013.01); *H04J 3/14* (2013.01); *H04L 43/50* (2013.01); *H04L 67/12* (2013.01)

(58) Field of Classification Search
CPC ........ G08B 25/01; G08B 25/08; G08B 25/14; G08B 29/00; G08B 29/04; G08B 29/06; G08B 29/16; H04B 10/00; H04B 10/29; H04L 67/12; H04L 43/50; H04L 12/437; H04J 3/14; H04Q 11/045; H04W 24/00
See application file for complete search history.

(56) References Cited

U.S. PATENT DOCUMENTS

| | | | | |
|---|---|---|---|---|
| 5,745,849 | A * | 4/1998 | Britton | ................. G08B 25/10 379/33 |
| 2004/0258410 | A1* | 12/2004 | Yajima | ................. H04L 7/0338 398/71 |
| 2006/0202109 | A1* | 9/2006 | Delcher | .............. H04B 10/806 250/214 R |
| 2012/0084400 | A1 | 4/2012 | Almadi et al. | |
| 2016/0218800 | A1* | 7/2016 | Murphy | ............. H04B 10/0795 |

* cited by examiner

*Primary Examiner* — Andrew W Bee
(74) *Attorney, Agent, or Firm* — Fish & Richardson P.C.

(57) ABSTRACT

A computer-implemented system includes the following. A remote terminal unit (RTU) is configured to receive alarm information and communicate alarm event information to a control center. An optical master unit (OMU) is configured to receive alarm information from sensors at remote locations. A circuit board is configured to serve as a middle device between the RTU and the OMU. A circuit board includes a microcontroller that communicates with the OMU and processes replies from the OMU to confirm the existence of and identify the type of an alarm at a particular remote location. The circuit board also includes multiple output relays connected to the RTU and corresponding to remote alarms, each output relay associated with a particular sensor at a remote location. The computer-implemented system also includes an input relay for communicating with the OMU.

20 Claims, 9 Drawing Sheets

OPTICAL MASTER UNIT ALARM COLLECTOR AND TRANSLATOR

BACKGROUND

The present disclosure applies to the field of alarm systems. Telecommunications buildings are typically monitored using an alarm monitoring system or simply a remote terminal unit. After collection of alarm status information, the status of the alarms can be transmitted to a communications control center, where operators can take action based on received information. Monitoring the status of alarms at remote locations can be challenging. Monitoring remote alarms may require expensive upgrades. For example, laying new fiber for a remote site can be very costly, in addition to the cost of new equipment that is installed at the remote location.

SUMMARY

The present disclosure describes techniques that can be used for an optical master unit alarm collector and translator. In some implementations, a computer-implemented system includes the following. A remote terminal unit (RTU) is configured to receive alarm information and communicate alarm event information to a control center. An optical master unit (OMU) is configured to receive alarm information from sensors at remote locations. A circuit board is configured to serve as a middle device between the RTU and the OMU. A circuit board includes a microcontroller that communicates with the OMU and processes replies from the OMU to confirm the existence of and identify the type of an alarm at a particular remote location. The circuit board also includes multiple output relays connected to the RTU and corresponding to remote alarms, each output relay associated with a particular sensor at a remote location. The computer-implemented system also includes an input relay for communicating with the OMU.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

Implementations described in this disclosure can realize one or more of the following advantages. First, use of the techniques in the present disclosure can avoid the need to lay new fiber cable for a remote site and can avoid the cost of installing new equipment in a remote location. Second, use of the techniques in the present disclosure can prevent the need for required upgrades of auxiliary systems over time. Third, use of the techniques in the present disclosure can provide modular expansions for existing and future additions of alarm systems with simple installation and minimal cost. Fourth, use of the techniques in the present disclosure can reduce the duration of communications shelters' failures by facilitating quick and timely responses to failure events in telecommunications systems. Fifth, use of the techniques in the present disclosure can provide quick and timely responses to fire incidents in telecommunications shelters.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various figures indicate like elements

DETAILED DESCRIPTION

The present disclosure describes techniques for an optical master unit alarm collector and translator. For example, an electronic circuit can be used to communicate through an RS-232 connection to an optical master unit (OMU) to retrieve alarm status of the OMU itself and alarm status of the OMU's remotely-connected wireless nodes. The electronic circuit can translate the alarm status to an alarm monitoring system (AMS), for example, a Valmet or General Electric D25 or other AMS commonly used in the telecommunications industry. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but is intended to be accorded the widest scope consistent with the described principles and features.

Figure 1:
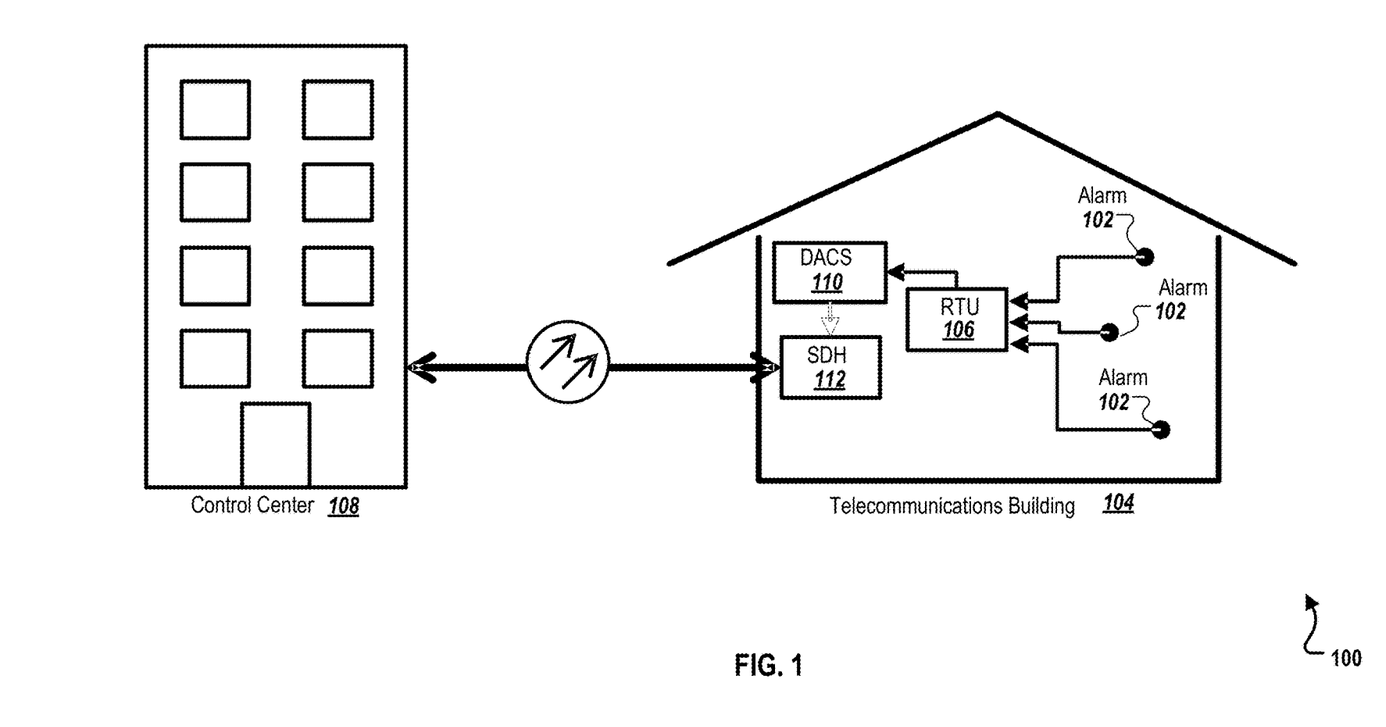
FIG. 1 is a diagram of an example of a telecommunications building alarm layout, according to some implementations of the present disclosure.

FIG. 1 is a diagram of an example of a telecommunications building alarm layout 100, according to some implementations of the present disclosure. For example, alarms 102 in a building (for example, a telecommunications building 104) can be collected by a remote terminal unit (RTU) 106 and then transmitted to a control center 108 through a digital access carrier system (DACS) system 110 and a synchronous digital hierarchy (SDH) system 112. The SDH system 112 can be linked to the control center 108 through fiber optic cables. Telecommunications building 104 can be monitored by an alarm monitoring device (AMD) or simply the RTU 106. Equipment inside the telecommunications building 104 can provide two-wire dry contacts that are connected to the RTU 106 to signal an alarm. For example, if power is cut off from the telecommunications building 104, rectifier contacts can close, indicating a "rectifier failure" to the RTU 106. Similarly, other equipment can signal its status. Other equipment can include, for example, a fire alarm, a building high temperature alarm, and other alarms positioned throughout the telecommunications building 104.

Alarm monitoring systems that are included in the telecommunications building 104 can include, for example, the VALMET Remote Terminal Unit and the General Electric D25. As status information is collected from the alarms, the alarm monitoring system can transmit the status information to a communications control center, for example, the control center 108, where the alarm status information can be used (and the alarms monitored) by operators who can take action when an alarm is received.

Communications to the control center 108 from the RTU 106 can be accomplished through the DACS 110, which can in turn send its collected information to the SDH system 112. The SDH system 112 can then transmit the information to the control center 108, for example, through optical fiber cables.

Figure 2:
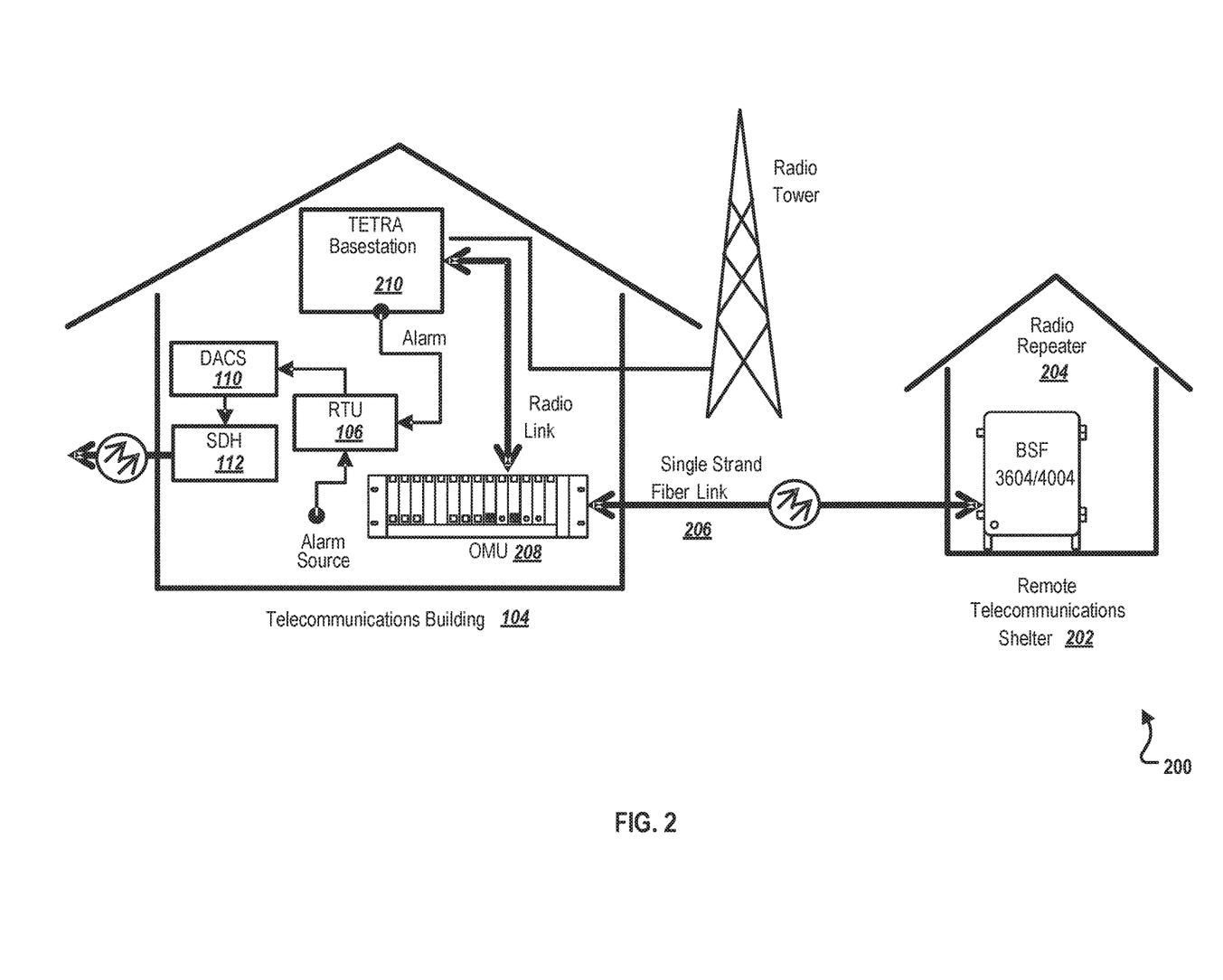
FIG. 2 is a diagram of an example of a configuration of a telecommunications building and a remote telecommunications shelter, according to some implementations of the present disclosure.

FIG. 2 is a diagram of an example of a configuration 200 of a telecommunications building 104 and a remote telecommunications shelter 202, according to some implementations of the present disclosure. A radio repeater 204 (for example, a BSF 3604/4004 radio repeater) can be installed in the remote telecommunications shelter 202 to extend radio coverage in an area surrounding the telecommunications shelter 202. The remote telecommunications shelter 202 can communicate with the nearest Terrestrial Trunked Radio (TETRA) base station (for example, the telecommunications building 104) through a single-strand fiber link 206 to an optical master unit (OMU) 208. The OMU 208 can serve as a management interface between the repeater 204 and a local TETRA base station 210.

TETRA solutions can be used in many communications systems. In some remote locations, a repeater system can be installed that is linked through fiber to a TETRA base station to extend the radio coverage to the remote area. An example of a repeated system is the Axell Wireless BSF 3604/4004 TETRA repeater.

In some implementations, the remote repeater can be linked to the telecommunications building 104 through a single strand of fiber terminating at the OMU 208, for example, if provided by the same vendor. The OMU 208 can then communicate the radio traffic to the TETRA base station 210.

Alarms can be collected from multiple sources in the telecommunications building 104, including alarms in the TETRA base station. However, with the existing setup, it is not possible to collect alarms from the remote shelter. To collect additional alarms, RTU, DACS and SDH systems need to be installed in the remote shelter.

Figure 3:
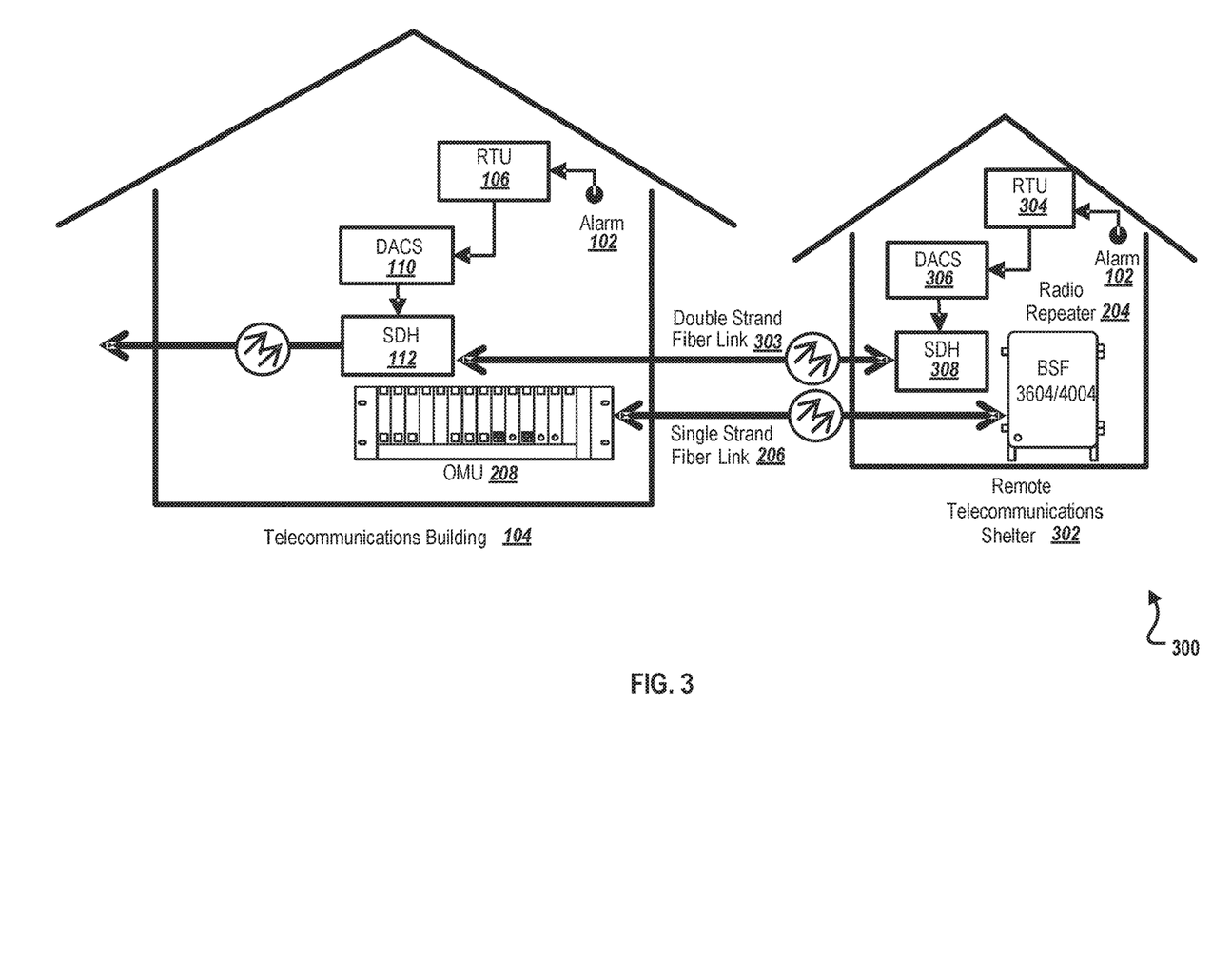
FIG. 3 is a diagram of an example of a configuration of a telecommunications building and a remote telecommunications shelter, according to some implementations of the present disclosure.

FIG. 3 is a diagram of an example of a configuration 300 of a telecommunications building 104 and a remote telecommunications shelter 302, according to some implementations of the present disclosure. In the configuration 300, in order to facilitate reading alarms from the remote telecommunications shelter 302, a double-strand fiber link 303 can be added for communication in addition to an RTU system 304, a DACS system 306, and an SDH system 308. This setup is a conventional way of linking alarms from one point to another.

In the configuration 300, the radio repeater 204 is managed by the OMU 208, as opposed to interfacing directly with the SDH 112. This solution, however, is not convenient for an existing system, as major expensive upgrades are required to be done. First, laying new fiber for a remote site is typically very costly. This cost is in addition to the cost of the new equipment installed in the remote telecommunications shelter 302. Second, the additional equipment in the remote telecommunications shelter 302 can require upgrades to the auxiliary systems already installed such as the backup battery system and the heating, ventilation, and air conditioning (HVAC) system, which in turn can result in the need to expand the shelter itself, adding more cost overhead.

Alternative techniques can be used for collecting alarms from the remote repeater. For example, both the radio repeater 204 and the OMU system 208 can be accessed locally through a serial RS-232. The access can enable a person to communicate with the devices through terminal instructions using, for example, a laptop computer. This communication can allow modifications and status checks of the devices. The status checks can include, for example, checking for internal alarm status of the units (such as cabinet door status of the radio repeater 204) and high temperature alarm status of the OMU system 208. Moreover, the remote repeater can have the capability to accept four external alarms, for example, named EX1, EX2, EX3, and EX4. The alarm entry points can be connected to other devices in the shelter such as a rectifier, smoke detector alarms, and an HVAC system. The status of these external entry points can also be checked through terminal instructions from the laptop computer.

Figure 4:
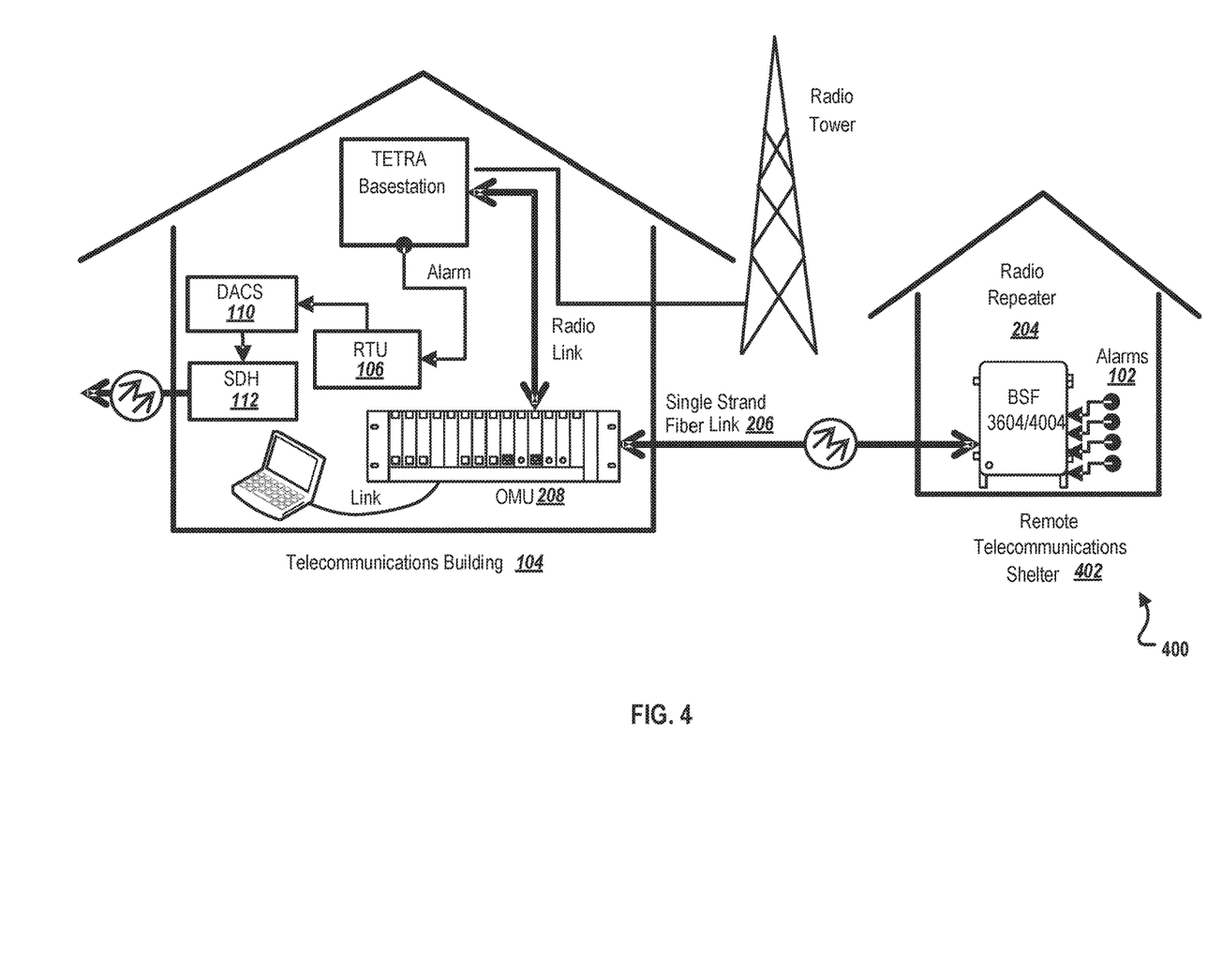
FIG. 4 is a diagram of an example of a configuration of a telecommunications building and a remote telecommunications shelter, according to some implementations of the present disclosure.

FIG. 4 is a diagram of an example of a configuration 400 of a telecommunications building 104 and a remote telecommunications shelter 402, according to some implementations of the present disclosure. The configuration 400 can include the use of a terminal program with the vendor instructions, enabling communication with, and management of, the OMU 208 and the radio repeater 204. In addition, information that is received from up to four alarms 102 can be read by the remote telecommunications shelter 402. However, the configuration 400 does not provide a mechanism to read the information automatically nor a way to link the alarms 102 to the RTU 106.

The OMU system 208 has the capability to instruct and retrieve information from the remote repeater 204. Thus, without the system modifications described with reference to FIG. 3, one can manually read alarm status of the remote telecommunications shelter 402 from the telecommunications building 104. However, this configuration still lacks the capability to automatically check alarms and transmit the alarm status information to the RTU system 106 in the telecommunications building 104.

Figure 5:
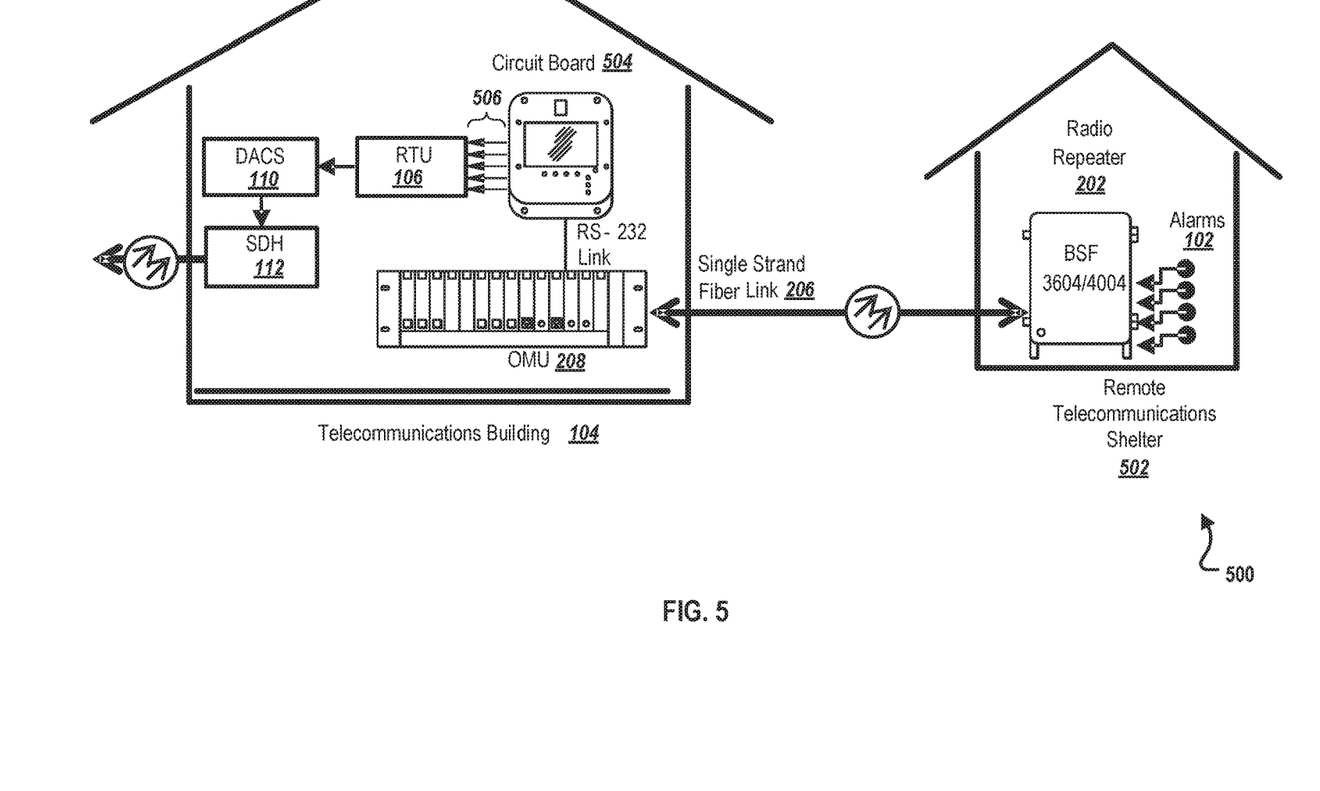
FIG. 5 is a diagram of an example of a configuration of a telecommunications building and a remote telecommunications shelter, according to some implementations of the present disclosure.

FIG. 5 is a diagram of an example of a configuration 500 of a telecommunications building 104 and a remote telecommunications shelter 502, according to some implementations of the present disclosure. The configuration 500 can use a local terminal program with the vendor instructions, enabling communication with and management of the OMU 208 and the radio repeater 202. In addition, information from up to four alarms 102 can be read by the remote telecommunications shelter 502.

The configuration 500 can provide an automatic reading of remote alarms and transmission to the control center by implementing a circuit board 504. For example, the circuit board 504 can serve as a middle device linking the OMU system 208 to the RTU system 106 in the telecommunications building 104. The circuit board 504 can include a microcontroller that communicates with the OMU system 208 through a serial RS-232 connection that continuously polls the remote repeater for alarms using the required terminal instructions. Then, the circuit board 504 can process the replies from the OMU system 208 to confirm the existence of an alarm 102 at the remote telecommunications shelter 502. After an alarm is detected, the circuit board 504 can operate an onboard relay that is linked externally to the RTU system 106 through dry contacts. In this way, all four alarms 102 can be read automatically, and the control center can see the status and take necessary actions the normal way.

The circuit board 504 can be equipped, for example, with five output relays. Four output relays 506 can be used for the alarms 102, and one output relay can be used for the OMU system 208 (or for repeater internal alarms). The circuit board 504 can also include pushbuttons, indicators, and a graphical liquid crystal display (LCD) display that, when used together, enable interactions by a user that include different manipulations and readings of the device status itself.

Figure 6:
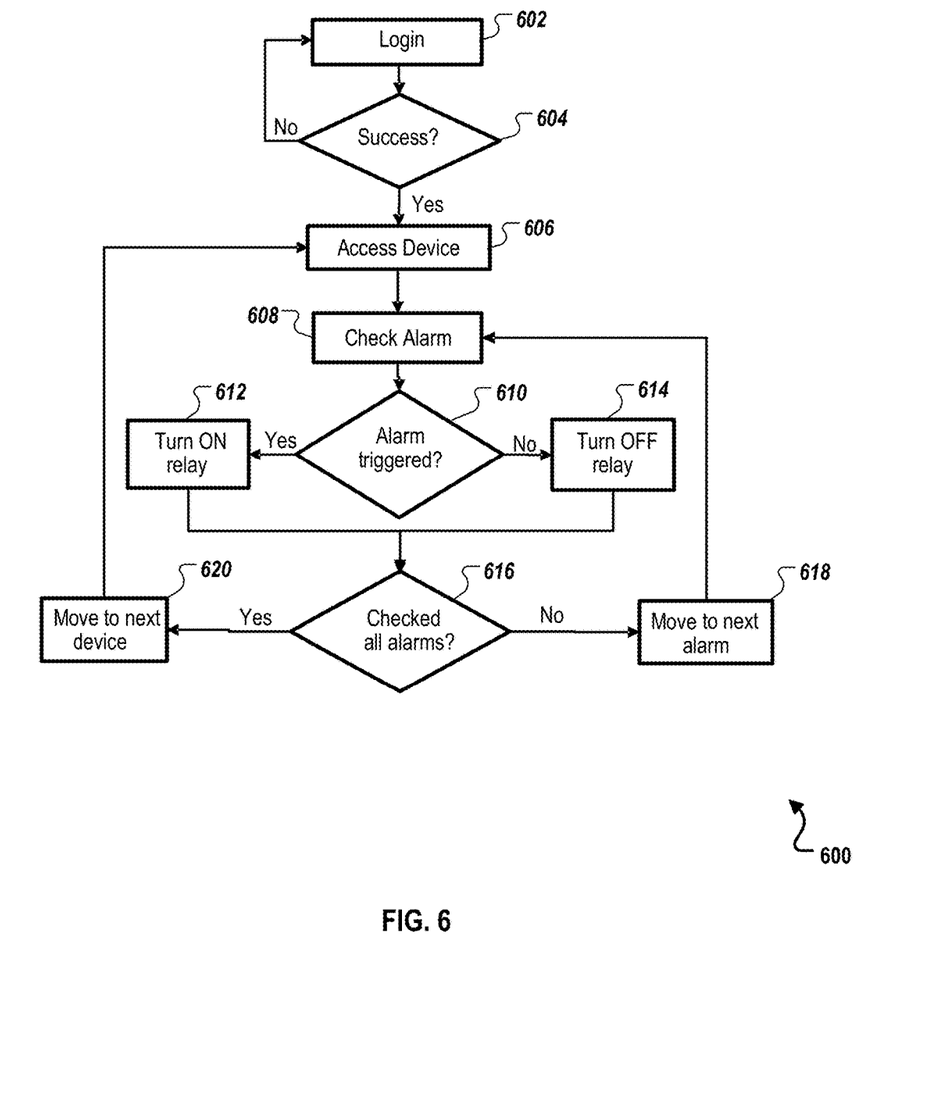
FIG. 6 is a flowchart showing an example of a method for checking alarms, according to some implementations of the present disclosure.

FIG. 6 is a flowchart showing an example of a method 600 for checking alarms, according to some implementations of the present disclosure. The circuit board 504, for example, can perform method 600. In some implementations, various steps of method 600 can be run in parallel, in combination, in loops, or in any order, such as to handle multiple devices at the same time.

The circuit board 504 can operate by cycling through the alarm status from the repeater for external alarm sources through an RS-232 connection. This will result in either turning on or turning off an associated relay that is linked to the RTU. The process can repeat for all repeaters connected to the OMU system 208 for all the available external alarms. The OMU system 208 can support up to six remote repeaters, and each repeater can provide the status of four external alarms.

At 602, a login occurs, for example, when a device (for example, a repeater) attempts to login to the OMU system 208. From 602, method 600 proceeds to 604.

At 604, a determination is made whether the login attempt is successful. From 604, method 600 proceeds to 606 when the login attempt is successful. Otherwise, when the login attempt is unsuccessful, method 600 proceeds to 602 for another login attempt.

At 606, a device is accessed. The device can be, for example, the radio repeater 204. From 606, method 600 proceeds to 608.

At 608, an alarm at the device is checked. For example, the alarm that is checked can be one of the alarms 102 at the remote telecommunications shelter 502. From 608, method 600 proceeds to 610.

At 610, a determination is made whether the alarm is triggered. For example, the circuit board 504 can request the status of the first alarm (for example, called EX1). The status that is received can be expected to be either 0 (for no alarm) or 1 (for alarm). From 610, method 600 proceeds to 612 if the alarm is triggered. Otherwise, method 600 proceeds to 614 if the alarm is not triggered.

At 612, the relay is turned on if the alarm is triggered. For example, "RELAY1" of the output relays 506 can be turned on when an alarm is detected. From 612, method 600 proceeds to 616

At 614, the relay is turned off if the alarm is not triggered. For example, "RELAY1" of the output relays 506 can be turned off when there no alarm is detected. From 614, method 600 proceeds to 616.

At 616, a determination is made whether all alarms have been checked. From 616, method 600 proceeds to 618 if it has been determined that all alarms for the current device have not been checked.

At 618, the circuit board 504 can move to the next alarm if it has been determined that not all alarms have been checked. For example, this is how the circuit board 504 can loop back and check the next alarm and control the associated output relay. From 616, method 600 proceeds to 620 if it has been determined that all alarms for the current device have been checked.

At 620, the circuit board 504 can move to the next device if it has been determined that all alarms for the current device have been checked. For example, when all alarms for the first repeater are checked, the circuit board 504 can then handle the process for the next repeater. Finally, when all 6 repeaters have been checked, the circuit board 504 can start over from the first repeater and continue processing alarm statuses. From 620, if no more devices need to be accessed, method 600 stops.

The circuit board 504 can be equipped with five output relays 506, with four output relays being dedicated to alarms EX1 to EX4, and the remaining output relay being used for other types of alarms. For example, the other types of alarms can include statuses such as "Communication Loss" or any other device trouble that might be encountered. Because configurations of the OMU system 208 and repeaters can vary between different installations, it is not necessary to always find a fixed number of repeaters connected to the OMU system 208. Therefore, the circuit board 504 can accept up to five additional daughter modules. The daughter modules can be inserted to the main device through onboard connectors that provide five output relays each. For example, if a particular installation has two remote repeaters and a single OMU, then the device can handle one repeater, and the additional module can handle the next repeater. The main device can perform all the control and operational instructions, but will provide a signal to a given module that tells the given module what relay to turn on and off.

Figure 7:
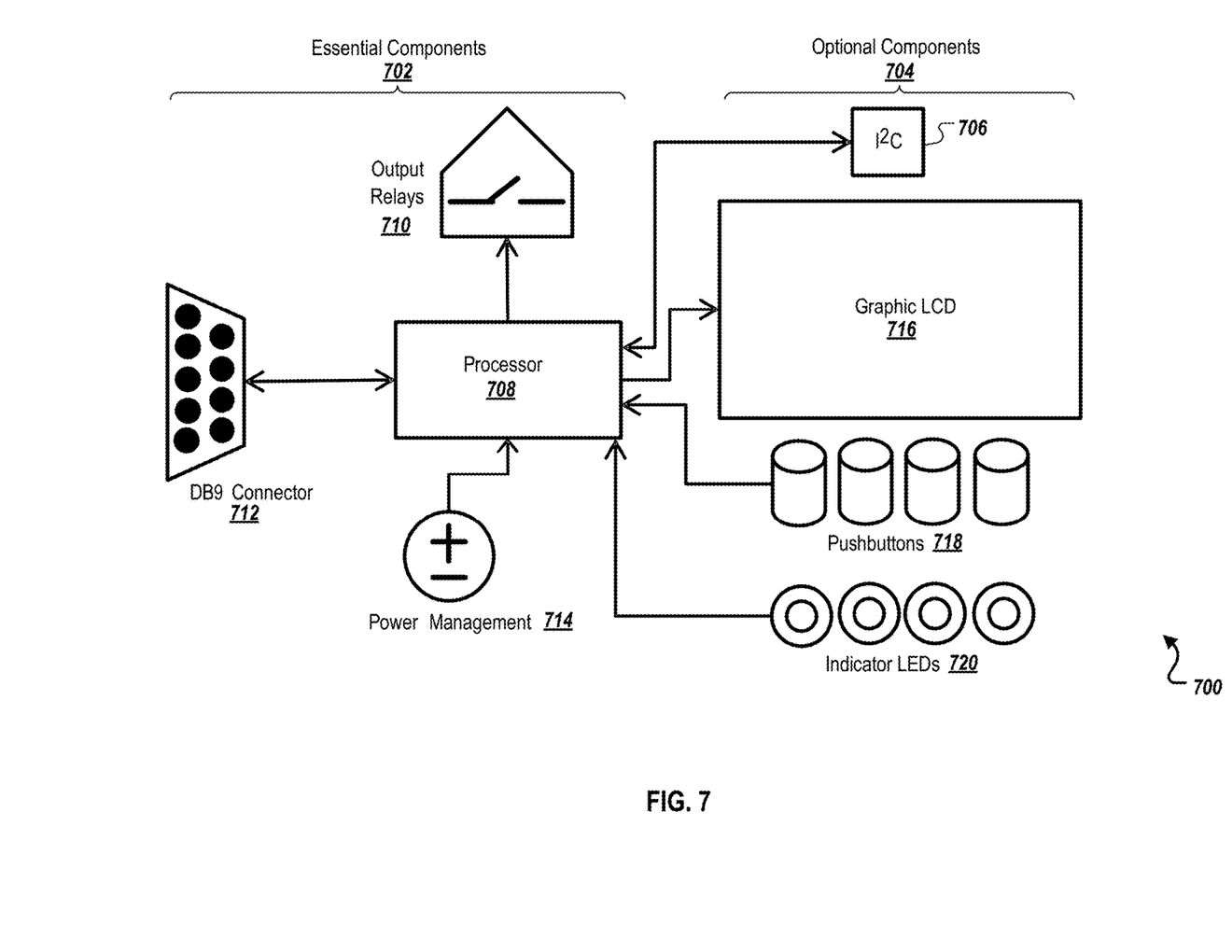
FIG. 7 is a block diagram showing examples of components of a circuit, according to some implementations of the present disclosure.

FIG. 7 is a block diagram showing examples of components of a circuit 700, according to some implementations of the present disclosure. For example, the circuit 700 can be the circuit board 504. The circuit 700 includes essential components 702 that are considered to be required for the system to work. The circuit 700 also includes optional components 704, including additional components that enable user communication via an (inter-integrated circuit) ($I^2C$) 706 with other extension devices and a user interface.

Among the essential components 702, the circuit 700 includes a processor 708 (for handling communications and commands) and output relays 710 for connecting to an RTU. The circuit 700 also includes an RS-232 link (for example, a DB9 connector 712) for communicating, for example, with the OMU system 208) and a power management component 714 to provide regulated power and account for safe operation of the circuit.

Among the optional components 704, the circuit 700 includes additional components for supporting a user interface (UI). A screen (for example, a graphical LCD screen 716) can display and enable interactions with textual information. Pushbuttons 718 can provide controls, for example, for navigating menus, and indicator light emitting diodes (LEDs) 720 to visually show the status of the relays or communications. Moreover, the $I^2C$ interface 706 can enable external communications with daughter devices.

In some implementations, the processor 708 can be the PIC18F6627 microcontroller from Microchip. The microcontroller can provide a lot of functionality and can be programmed using C language. The microcontroller can be programmed, for example, using the MikroProg programmer from Mikcroelektronica through a 5×2 ribbon connector. This connector can remain during program testing and development.

Relays can be chosen to be dual coil relays. The relays can typically be used for telecommunications applications, such as those manufactured by Kemet. The added benefit for using dual coil relays is to avoid overheating the relay during a long operation time. Given the nature of alarms, the relay may be held working for several hours or even days, which runs the risk of damaging the relay internally.

The set of four relays can be driven, for example, by a ULN2803ADWR Darlington array. The chip can provide a small footprint, reliable buffering, and coil protection using internal diodes. The array can be driven directly from the microcontroller. Finally, the relays can be connected to a two-layer, 5×2 terminal connector, such as the one manufactured by Phoenix Contact, to allow easy termination and installation. These contacts can be terminated at the OMU system 208 through proper wires such as unshielded twisted pair (UTP) cables.

A fifth relay can be connected similarly while being driven by a different combination of components. The relay can be driven by the QS5W2TR dual transistor IC from Rohm Semiconductor and protected by two SMA diodes from Diodes Incorporated, namely the S1D-13-F. The transistors can be operated by the microcontroller through typical 10 kΩ resistors, such as the ones from Yageo.

The OMU system 208 can communicate with the device, for example, through an RS-232 serial link. This can be accomplished, for example, by using a MAX232 buffer that converts the serial signal to proper voltage levels between the microcontroller and the OMU system 208. The capacitors surrounding it can be for conversion purposes as proposed by the chip manufacturer MAXIM-IC. The signals can then travel out of (and into) the device through a male DB9 connector to use standard modem cables.

In some implementations, an $I^2C$ serial link can be used as a complementary link, added for the purpose of communicating with external devices such as the daughter modules. The communication and clock links can be pulled up by 1.5 kΩ resistors to ensure proper operation under the $I^2C$ standard design considerations. Also, a 5×2 right-angled male header connector, for example, from Amphenol $I^2CI$, can be deliberately made to extend out the board boundaries to connect with an opposite female connector from the daughter boards.

The power can be regulated using, for example, a PYB10 DC to DC converter from CUI that provides excellent power stepped down from 48 Vdc to 5 Vdc for circuit operation. The device can get its power, for example, through a two-position terminal block that provides rigid contacts to external wires. A series of protection components for transients and other phenomena can exist between the connector and the converter. For testing purposes, a 5 mm power jack can be provided to power the device directly from a 5 Vdc supply and can be isolated through a jumper.

A user interface can include a graphical LCD, pushbuttons, and indicator LEDs to provide a convenient environment for the user. The LCD can be implemented, for example, using part number CFAG240125L-STI-TZ (providing a 240×128 pixel screen) from Crystalfontz. The LCD can be interfaced with the device through a 20-wire ribbon cable and ribbon connector.

The pushbuttons and the LEDs can be general purpose components that are targeted for direct interactions. The LEDs can be linked to the relays to indicate their status (ON or OFF) while a given LED can serve to indicate good communications. The pushbuttons can allow the user to choose options, navigate menus, and conduct general tests.

The circuit board can be manufactured, for example, to fit in a PFF18-4-18 W plastic enclosure from Takashi Electronic Enclosures. The enclosure's size and dimensions can ease vertical installation and provide excellent fit for a wide graphical LCD. The layout of the components can be chosen to allow simple connections.

Figure 8:
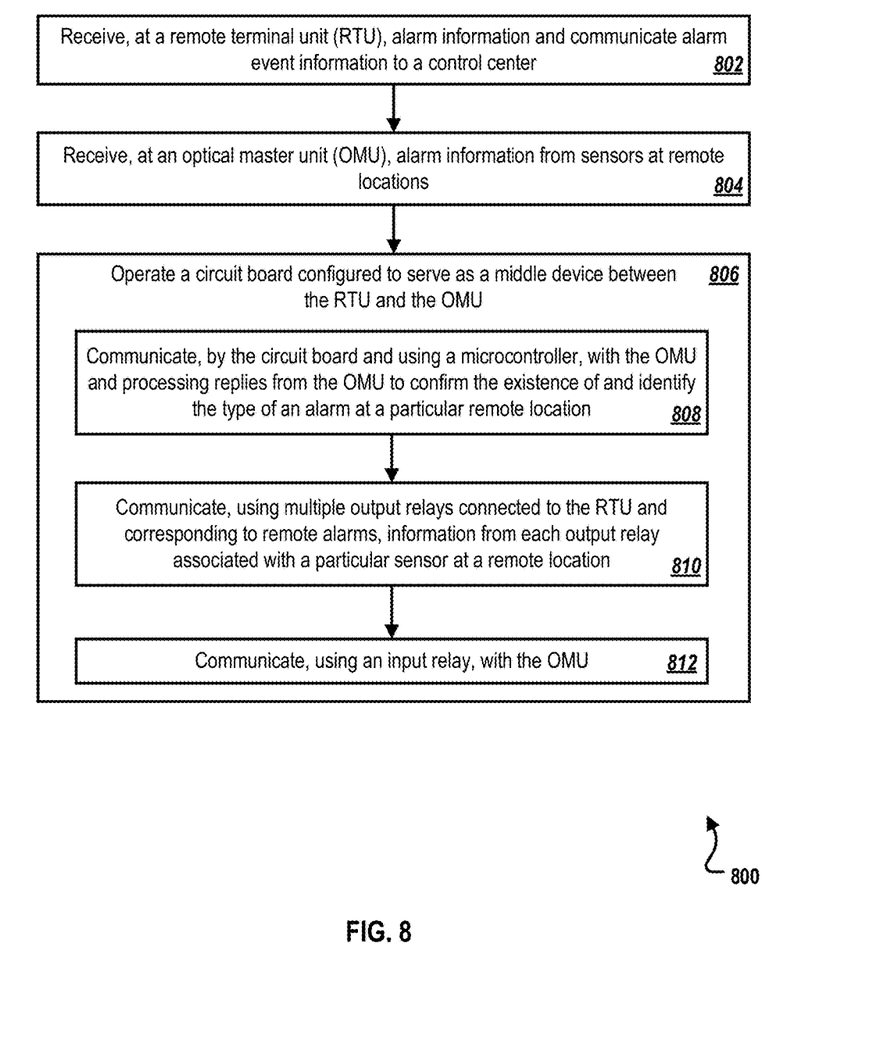
FIG. 8 is a flowchart showing an example of a method for communicating alarm information using a circuit board, according to some implementations of the present disclosure.

FIG. 8 is a flowchart showing an example of a method 800 for communicating alarm information using a circuit board, according to some implementations of the present disclosure. For clarity of presentation, the description that follows generally describes method 800 in the context of the other figures in this description. However, it will be understood that method 800 may be performed, for example, by any system, environment, software, and hardware, or a combination of systems, environments, software, and hardware. In some implementations, various steps of method 800 can be run in parallel, in combination, in loops, or in any order.

At 802, alarm information is received at an RTU, and the RTU communicates alarm event information to a control center. For example, alarm information received by the RTU 106 can be provided to the DACS 110 for use by users at the telecommunications building 104. From 802, method 800 proceeds to 804.

At 804, alarm information from sensors at remote locations is received at an optical master unit (OMU). As an example, the OMU 208 at the telecommunications building 104 can receive alarm information from the remote telecommunications shelter 502 though the single strand fiber link 206. From 804, method 800 proceeds to 806.

At 806, a circuit board is operated that is configured to serve as a middle device between the RTU and the OMU. For example, the circuit board 504 can serve as an interface between the RTU 106 and the OMU 208. The operating includes steps 808-812.

At 808, communication occurs, using a microcontroller, between the circuit board and the OMU, and replies from the OMU are processed to confirm the existence of and identify the type of an alarm at a particular remote location. For example, the circuit board 504 can use information received from the OMU 208 to determine the status of various alarms 102 at the remote telecommunications shelter 502. From 808, method 800 proceeds to 810.

At 810, using multiple output relays connected to the RTU and corresponding to remote alarms, information is communicated from each output relay associated with a particular sensor at a remote location. As an example, the circuit board 504 can use various ones of the output relays 506 to inform the RTU 106 of the status of corresponding alarms 102. From 810, method 800 proceeds to 812.

At 812, using an input relay, communication occurs between the circuit board and the OMU. For example, the circuit board 504 can use an input, such as using an RS-232 link, to receive information from the OMU 208. From 812, method 800 stops.

Figure 9:
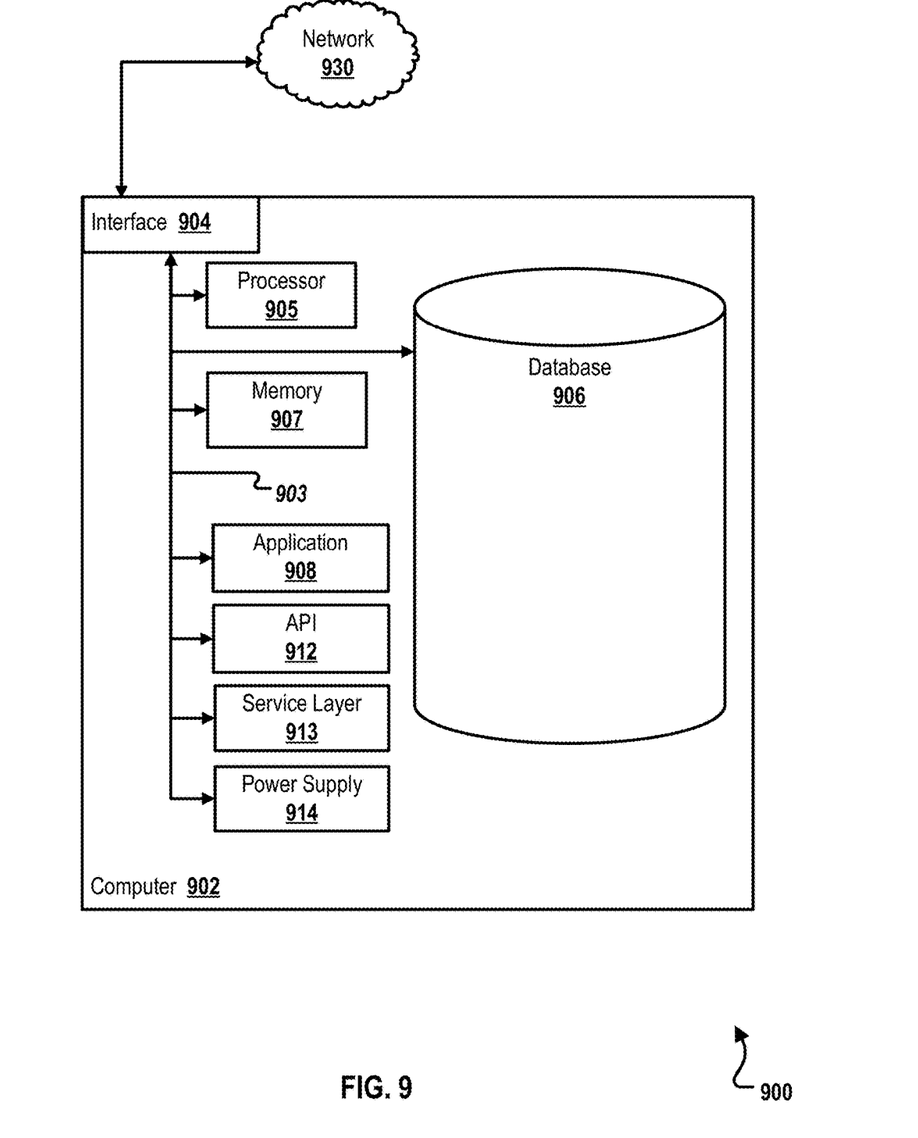
FIG. 9 is a block diagram illustrating an example computer system used to provide computational functionalities associated with described algorithms, methods, functions, processes, flows, and procedures as described in the instant disclosure, according to some implementations of the present disclosure.

FIG. 9 is a block diagram of an example computer system 900 used to provide computational functionalities associated with described algorithms, methods, functions, processes, flows, and procedures, as described in the instant disclosure, according to some implementations of the present disclosure. The illustrated computer 902 is intended to encompass any computing device such as a server, desktop computer, laptop/notebook computer, wireless data port, smart phone, personal data assistant (PDA), tablet computing device, one or more processors within these devices, or any other processing device, including physical or virtual instances (or both) of the computing device. Additionally, the computer 902 may comprise a computer that includes an input device, such as a keypad, keyboard, or touch screen that can accept user information, and an output device that conveys information associated with the operation of the computer 902, including digital data, visual, or audio information (or a combination of information), or a graphical-type user interface (UI) (or GUI).

The computer 902 can serve in a role as a client, network component, a server, a database, a persistency, or any other component (or a combination of roles) of a computer system for performing the subject matter described in the instant disclosure. The illustrated computer 902 is communicably coupled with a network 930. In some implementations, one or more components of the computer 902 may be configured to operate within environments, including cloud-computing-based, local, or global environment (or a combination of environments).

The computer 902 is an electronic computing device operable to receive, transmit, process, store, or manage data and information associated with the described subject matter. According to some implementations, the computer 902 may also include or be communicably coupled with an application server, email server, web server, caching server, or streaming data server (or a combination of servers).

The computer 902 can receive requests over network 930 from a client application (for example, executing on another computer 902) and respond to the received requests by processing the received requests using software applications. In addition, requests may also be sent to the computer 902 from internal users (for example, from a command console or another access method), external or third-parties, other automated applications, as well as entities, individuals, systems, or computers.

Each of the components of the computer 902 can communicate using a system bus 903. In some implementations, any or all of the components of the computer 902, hardware or software (or a combination of both hardware and software), may interface with each other or the interface 904 (or a combination of both), over the system bus 903 using an application programming interface (API) 912 or a service layer 913 (or a combination of the API 912 and service layer 913). The API 912 may include specifications for routines, data structures, and object classes. The API 912 may be either computer-language independent or dependent and refer to a complete interface, a single function, or even a set of APIs. The service layer 913 provides software services to the computer 902 and other components (whether or not illustrated) that are communicably coupled to the computer 902. The functionality of the computer 902 may be accessible for all service consumers using this service layer. Software services, such as those provided by the service layer 913, provide reusable, defined functionalities through a defined interface. For example, the interface may be software written in JAVA, C++, or another language providing data in extensible markup language (XML) format. While illustrated as an integrated component of the computer 902, alternative implementations may illustrate the API 912 or the service layer 913 as stand-alone components in relation to other components of the computer 902 and other components (whether or not illustrated) that are communicably coupled to the computer 902. Moreover, any or all parts of the API 912 or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902. The interface 904 is used by the computer 902 for communicating with other systems that are connected to the network 930 (whether illustrated or not) in a distributed environment. Generally, the interface 904 comprises logic encoded in software or hardware (or a combination of software and hardware) and is operable to communicate with the network 930. More specifically, the interface 904 may comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors may be used according to particular needs, desires, or particular implementations of the computer 902. Generally, the processor 905 executes instructions and manipulates data to perform the operations of the computer 902 and any algorithms, methods, functions, processes, flows, and procedures as described in the instant disclosure.

The computer 902 also includes a database 906 that can hold data for the computer 902 and other components (or a combination of both) that can be connected to the network 930 (whether illustrated or not). For example, database 906 can be an in-memory or conventional database storing data consistent with this disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases (of the same or combination of types) can be used according to particular needs, desires, or particular implementations of the computer 902 and the described functionality. While database 906 is illustrated as an integral component of the computer 902, in alternative implementations, database 906 can be external to the computer 902.

The computer 902 also includes a memory 907 that can hold data for the computer 902 and other components (or a combination of both) that can be connected to the network 930 (whether illustrated or not). Memory 907 can store any data consistent with this disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same or combination of types) can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in this disclosure. For example, application 908 can serve as one or more components, modules, or applications. Further, although illustrated as a single application 908, the application 908 may be implemented as multiple applications 908 on the computer 902. In addition, although illustrated as integral to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion or management circuits (including recharging, standby, or a different power management functionality). In some implementations, the power-supply 914 can include a power plug to allow the computer 902 to be plugged into a wall socket to, for example, power the computer 902 or recharge a rechargeable battery.

There may be any number of computers 902 associated with, or external to, a computer system containing computer 902, each computer 902 communicating over network 930. Further, the term "client," "user," and other terminology may be used interchangeably without departing from the scope of this disclosure. Moreover, this disclosure contemplates that many users may use one computer 902, or that one user may use multiple computers 902.

Described implementations of the subject matter can include one or more features, alone or in combination.

For example, in a first implementation, a computer-implemented system includes the following. A remote terminal unit (RTU) is configured to receive alarm information and communicate alarm event information to a control center. An optical master unit (OMU) is configured to receive alarm information from sensors at remote locations. A circuit board is configured to serve as a middle device between the RTU and the OMU. A circuit board includes a microcontroller that communicates with the OMU and processes replies from the OMU to confirm the existence of and identify the type of an alarm at a particular remote location. The circuit board also includes multiple output relays connected to the RTU and corresponding to remote alarms, each output relay associated with a particular sensor at a remote location. The computer-implemented system also includes an input relay for communicating with the OMU.

The foregoing and other described implementations can each, optionally, include one or more of the following features:

A first feature, combinable with any of the following features, wherein receiving alarm information includes polling a remote repeater for the alarm information.

A second feature, combinable with any of the previous or following features, wherein the polling is through a single strand fiber link.

A third feature, combinable with any of the previous or following features, wherein communication with the OMU is through a serial RS-232 connection.

A fourth feature, combinable with any of the previous or following features, wherein the RTU is an alarm monitoring system.

A fifth feature, combinable with any of the previous or following features, further comprising a user interface.

A sixth feature, combinable with any of the previous or following features, wherein the user interface includes a graphical liquid crystal display (LCD), pushbuttons, and indicator LEDs.

In a second implementation, a computer-implemented method includes the following. Alarm information is received at an RTU, and alarm event information is communicated to a control center. Alarm information is received at an OMU, from sensors at remote locations. A circuit board is operated that is configured to serve as a middle device between the RTU and the OMU. The operating includes communicating, by the circuit board and using a microcontroller, with the OMU and processing replies from the OMU to confirm the existence of and identify the type of an alarm at a particular remote location. The operating also includes communicating, using multiple output relays connected to the RTU and corresponding to remote alarms, information from each output relay associated with a particular sensor at a remote location. The operating also includes communicating, using an input relay, with the OMU.

The foregoing and other described implementations can each, optionally, include one or more of the following features:

A first feature, combinable with any of the following features, wherein receiving alarm information includes polling a remote repeater for the alarm information.

A second feature, combinable with any of the previous or following features, wherein the polling is through a single strand fiber link.

A third feature, combinable with any of the previous or following features, wherein communication with the OMU is through a serial RS-232 connection.

A fourth feature, combinable with any of the previous or following features, wherein the RTU is an alarm monitoring system.

A fifth feature, combinable with any of the previous or following features, further comprising receiving user input through a user interface.

A sixth feature, combinable with any of the previous or following features, wherein the user interface includes a graphical liquid crystal display (LCD), pushbuttons, and indicator LEDs.

In a third implementation, a non-transitory, computer-readable medium storing one or more instructions executable by a computer system to perform operations comprising the following. Alarm information is received at an RTU, and alarm event information is communicated to a control center. Alarm information is received at an OMU, from sensors at remote locations. A circuit board is operated that is configured to serve as a middle device between the RTU and the OMU. The operating includes communicating, by the circuit board and using a microcontroller, with the OMU and processing replies from the OMU to confirm the existence of and identify the type of an alarm at a particular remote location. The operating also includes communicating, using multiple output relays connected to the RTU and corresponding to remote alarms, information from each output relay associated with a particular sensor at a remote location. The operating also includes communicating, using an input relay, with the OMU.

The foregoing and other described implementations can each, optionally, include one or more of the following features:

A first feature, combinable with any of the following features, wherein receiving alarm information includes polling a remote repeater for the alarm information.

A second feature, combinable with any of the previous or following features, wherein the polling is through a single strand fiber link.

A third feature, combinable with any of the previous or following features, wherein communication with the OMU is through a serial RS-232 connection.

A fourth feature, combinable with any of the previous or following features, wherein the RTU is an alarm monitoring system.

A fifth feature, combinable with any of the previous or following features, the operations further comprising receiving user input through a user interface.

The foregoing and other described implementations can each, optionally, include one or more of the following features:

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS, or any other conventional operating system.

A computer program, which may also be referred to or described as a program, software, a software application, a module, a software module, a script, or code can be written in any form of programming language. A computer program can include compiled or interpreted languages, or declarative or procedural languages. A computer program can be deployed in any form, including as a stand-alone program or as a module, component, or subroutine for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or processes, the programs may instead include a number of sub-modules, third-party services, components, or libraries. Conversely, the features and functionality of various components can be combined into single components. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers that can be used for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/ removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other information including any parameters, variables, algorithms, instructions, rules, constraints, or references. Additionally, the memory may include any other data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, or data (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in the present disclosure can be any file system type accessible from multiple servers for read and update. Locking or consistency tracking is not necessary since the locking of exchange file system can be done at application layer. Furthermore, Unicode data files are different from non-Unicode data files.

While this specification contains many specific implementation details, these should not be construed as limitations on the scope of the present disclosure or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method;

a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented system, comprising:
 a remote terminal unit (RTU) configured to receive alarm information and communicate alarm event information to a control center;
 an optical master unit (OMU) configured to receive alarm information from sensors at remote locations; and
 a circuit board configured to serve as a middle device between the RTU and the OMU and comprising:
  a microcontroller that communicates with the OMU and processes replies from the OMU to confirm the existence of and identify the type of an alarm at a particular remote location;
  multiple output relays connected to the RTU and corresponding to remote alarms, each output relay associated with a particular sensor at a remote location; and
  an input relay for communicating with the OMU.

2. The computer-implemented system of claim 1, wherein receiving alarm information includes polling a remote repeater for the alarm information.

3. The computer-implemented system of claim 2, wherein the polling is through a single strand fiber link.

4. The computer-implemented system of claim 1, wherein communication with the OMU is through a serial RS-232 connection.

5. The computer-implemented system of claim 1, wherein the RTU is an alarm monitoring system.

6. The computer-implemented system of claim 1, further comprising a user interface.

7. The computer-implemented system of claim 6, wherein the user interface includes a graphical liquid crystal display (LCD), pushbuttons, and indicator LEDs.

8. A computer-implemented method, comprising:
 receiving, at a remote terminal unit (RTU), alarm information and communicating alarm event information to a control center;
 receiving, at an optical master unit (OMU), alarm information from sensors at remote locations; and
 operating a circuit board configured to serve as a middle device between the RTU and the OMU, the operating comprising:
  communicating, by the circuit board and using a microcontroller, with the OMU and processing replies from the OMU to confirm the existence of and identify the type of an alarm at a particular remote location;
  communicating, using multiple output relays connected to the RTU and corresponding to remote alarms, information from each output relay associated with a particular sensor at a remote location; and
  communicating, using an input relay, with the OMU.

9. The computer-implemented method of claim 8, wherein receiving alarm information includes polling a remote repeater for the alarm information.

10. The computer-implemented method of claim 9, wherein the polling is through a single strand fiber link.

11. The computer-implemented method of claim 8, wherein communication with the OMU is through a serial RS-232 connection.

12. The computer-implemented method of claim 8, wherein the RTU is an alarm monitoring system.

13. The computer-implemented method of claim 8, further comprising receiving user input through a user interface.

14. The computer-implemented method of claim 13, wherein the user interface includes a graphical liquid crystal display (LCD), pushbuttons, and indicator LEDs.

15. A non-transitory, computer-readable medium storing one or more instructions executable by a computer system to perform operations comprising:
 receiving, at a remote terminal unit (RTU), alarm information and communicating alarm event information to a control center;
 receiving, at an optical master unit (OMU), alarm information from sensors at remote locations; and
 operating a circuit board configured to serve as a middle device between the RTU and the OMU, the operating comprising:
  communicating, by the circuit board and using a microcontroller, with the OMU and processing replies from the OMU to confirm the existence of and identify the type of an alarm at a particular remote location;
  communicating, using multiple output relays connected to the RTU and corresponding to remote alarms, information from each output relay associated with a particular sensor at a remote location; and
  communicating, using an input relay, with the OMU.

16. The non-transitory, computer-readable medium of claim 15, wherein receiving alarm information includes polling a remote repeater for the alarm information.

17. The non-transitory, computer-readable medium of claim 16, wherein the polling is through a single strand fiber link.

18. The non-transitory, computer-readable medium of claim 15, wherein communication with the OMU is through a serial RS-232 connection.

19. The non-transitory, computer-readable medium of claim 15, wherein the RTU is an alarm monitoring system.

20. The non-transitory, computer-readable medium of claim 15, the operations further comprising receiving user input through a user interface.

* * * * *